US006688919B2

(12) United States Patent
Sumer et al.

(10) Patent No.: US 6,688,919 B2
(45) Date of Patent: Feb. 10, 2004

(54) HOUSING FOR TELECOMMUNICATIONS MODULE

(75) Inventors: Suleyman Oguz Sumer, Raleigh, NC (US); James Edward Bartlett, Cary, NC (US); Brian Donald Van Voorhis, Wake Forest, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 134 days.

(21) Appl. No.: 09/981,935

(22) Filed: Oct. 16, 2001

(65) Prior Publication Data

US 2003/0073338 A1 Apr. 17, 2003

(51) Int. Cl.$^7$ .................................................. H01R 9/22
(52) U.S. Cl. .............. 439/718; 379/413.04; 379/399.01
(58) Field of Search ................................ 439/718, 409; 379/399.01, 412, 413.02, 413.03, 413.04

(56) References Cited

U.S. PATENT DOCUMENTS

| | | |
|---|---|---|
| 4,725,241 A | 2/1988 | Bertini et al. |
| 4,874,333 A | 10/1989 | Reed |
| 5,037,320 A | 8/1991 | Stolte |
| 5,667,402 A | 9/1997 | Denovich et al. |
| 5,901,220 A | 5/1999 | Garver et al. |
| 5,989,074 A | 11/1999 | Miller et al. |
| 6,026,160 A * | 2/2000 | Staber et al. .......... 379/413.03 |
| 6,078,661 A | 6/2000 | Arnett et al. |
| 6,099,333 A | 8/2000 | Daoud et al. |
| 6,152,760 A | 11/2000 | Reeser |
| 6,246,749 B1 | 6/2001 | Garver et al. |
| 6,525,677 B1 * | 2/2003 | Printzis ....................... 341/31 |

OTHER PUBLICATIONS

AMP Application Specification 114–6062, Rev. O, Aug. 1, 1996, Pivot Connectors, pp. 1–10.

* cited by examiner

*Primary Examiner*—Javaid H. Nasri
(74) *Attorney, Agent, or Firm*—Fogg and Associates, LLC; Scott V. Lundberg

(57) ABSTRACT

A housing having a shell, a first compartment, and a second compartment within the first compartment is provided. A first cover is pivotally attached to the shell for selectively opening and closing the first compartment. The first cover has a resilient latch biased for grasping the shell and a lead-out for wires. A second cover is pivotally attached to the shell for selectively opening and closing the second compartment. A plurality of pivot connectors is located in the first compartment. Each of the plurality of pivot connectors is oriented to receive a wire in a direction parallel to a plane of the lead-out for wires. A plurality of jacks is also located in the first compartment. Each of the plurality of jacks has at least one resilient conductor. Each of the plurality of jacks is oriented so that the resilient conductor lies in a plane perpendicular to the plane of the lead-out for wires.

63 Claims, 17 Drawing Sheets

HOUSING FOR TELECOMMUNICATIONS MODULE

CROSS REFERENCE TO RELATED APPLICATIONS

This application is related to copending design application U.S. Ser. No. 29/149,535, now issued as U.S. Pat. No. D461,797, entitled Housing for Telecommunications Module, filed on Oct. 10, 2001.

TECHNICAL FIELD

The present invention relates generally to the field of telecommunications and, in particular, to housings for telecommunications modules.

BACKGROUND

Integrated access devices (IADs) are typically installed at a subscriber location, such as a home, business, apartment complex, etc., and serve as an interface between a network service provider, such as a telephone service provider, and, for example, each of several subscribers. IADs usually multiplex a variety of subscriber equipment for each subscriber, e.g., telephones, facsimile machines, modems, etc., at the subscriber location onto a single telephone line for transmission to the network service provider. IADs also de-multiplex incoming streams, e.g., voice, data, etc., into their respective channels.

Many IADs are divided into a subscriber section and a service-provider section. Typically, the subscriber section has connectors, e.g., plugs and jacks, for connecting subscriber equipment to the network service provider via service provider communication lines that terminate at the service-provider section. The connectors of the subscriber section normally enable the subscriber to isolate failures to either the subscriber equipment or the service-provider network.

IADs are usually enclosed in housings that serve to protect IAD components and to mount the IAD to a wall, for example. Moreover, these housings normally isolate the subscriber section from the service-provider section by providing separate subscriber and provider compartments for the subscriber and service-provider sections, respectively. Usually, the housing is configured to provide subscriber access to the subscriber compartment and to limit provider compartment access to service-provider personnel.

One problem with many existing housings is that these housings require a tool for accessing the subscriber compartment. Another problem occurs when an IAD serves several subscribers, such as in apartment complexes, office buildings, etc., so that the subscriber compartment has a multitude of connectors and wires. In these instances, the layout of the connectors within the subscriber compartments of a number of housings makes it difficult for subscribers to access the connectors and results in overly complex wiring paths and undesirably large housings.

For the reasons stated above, and for other reasons stated below which will become apparent to those skilled in the art upon reading and understanding the present specification, there is a need in the art for housings for integrated access devices providing easier access to subscriber compartments, easier access to connectors and for reducing the complexity of the wiring paths and thus the size of the housing.

SUMMARY

The above-mentioned problems with many housings for integrated access devices, including accessing the subscriber compartment, connector layout, wiring complexity, and housing size, and other problems are addressed by embodiments of the present invention and will be understood by reading and studying the following specification. Embodiments of the present invention provide housings having subscriber compartments that are accessible without tools and in which the connectors are laid out for easier access by subscribers and for reducing the complexity of the wiring paths and thus the size of the housing.

More particularly, in one embodiment, a housing having a shell, a first compartment, and a second compartment within the first compartment is provided. A first cover is pivotally attached to the shell for selectively opening and closing the first compartment. The first cover has a resilient latch biased for grasping the shell and a lead-out for wires. A second cover is pivotally attached to the shell for selectively opening and closing the second compartment. A plurality of pivot connectors is located in the first compartment. Each of the plurality of pivot connectors is oriented to receive a wire in a direction parallel to a plane of the lead-out for wires. A plurality of jacks is also located in the first compartment. Each of the plurality of jacks has at least one resilient conductor. Each of the plurality of jacks is oriented so that the resilient conductor lies in a plane perpendicular to the plane of the lead-out for wires.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

FIGS. 1–22 illustrate various embodiments of aspects of a housing 100 according to the teachings of the present invention. Housing 100 has a shell 101, a cover 102 pivotally attached to shell 101, and a compartment 103 (shown in FIG. 2). As discussed below, in one embodiment, compartment 103 is a subscriber compartment that contains connectors, e.g., plugs and jacks, for connecting subscriber equipment, such as telephones, facsimile machines, modems, etc., to a network service provider.

Figure 1:
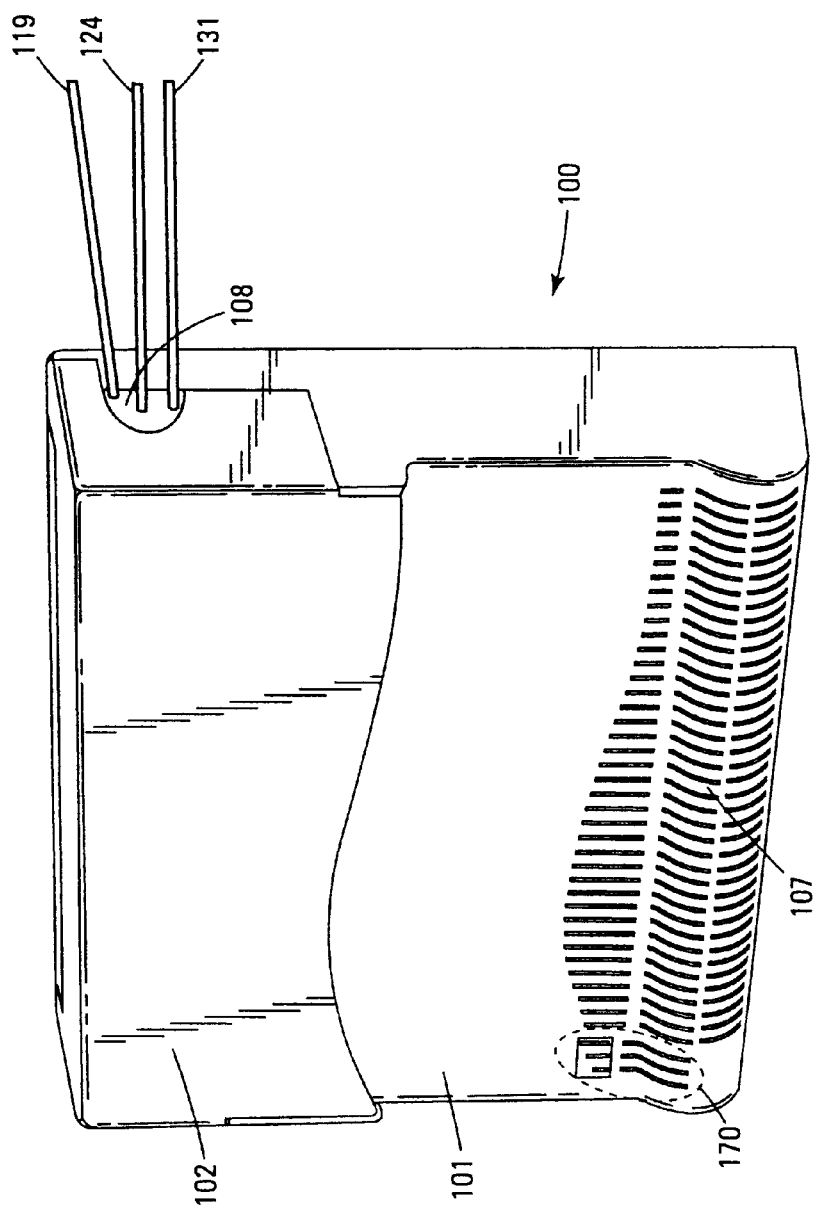
FIG. 1 is a perspective view of an embodiment of a housing of the present invention.
Figure 2:
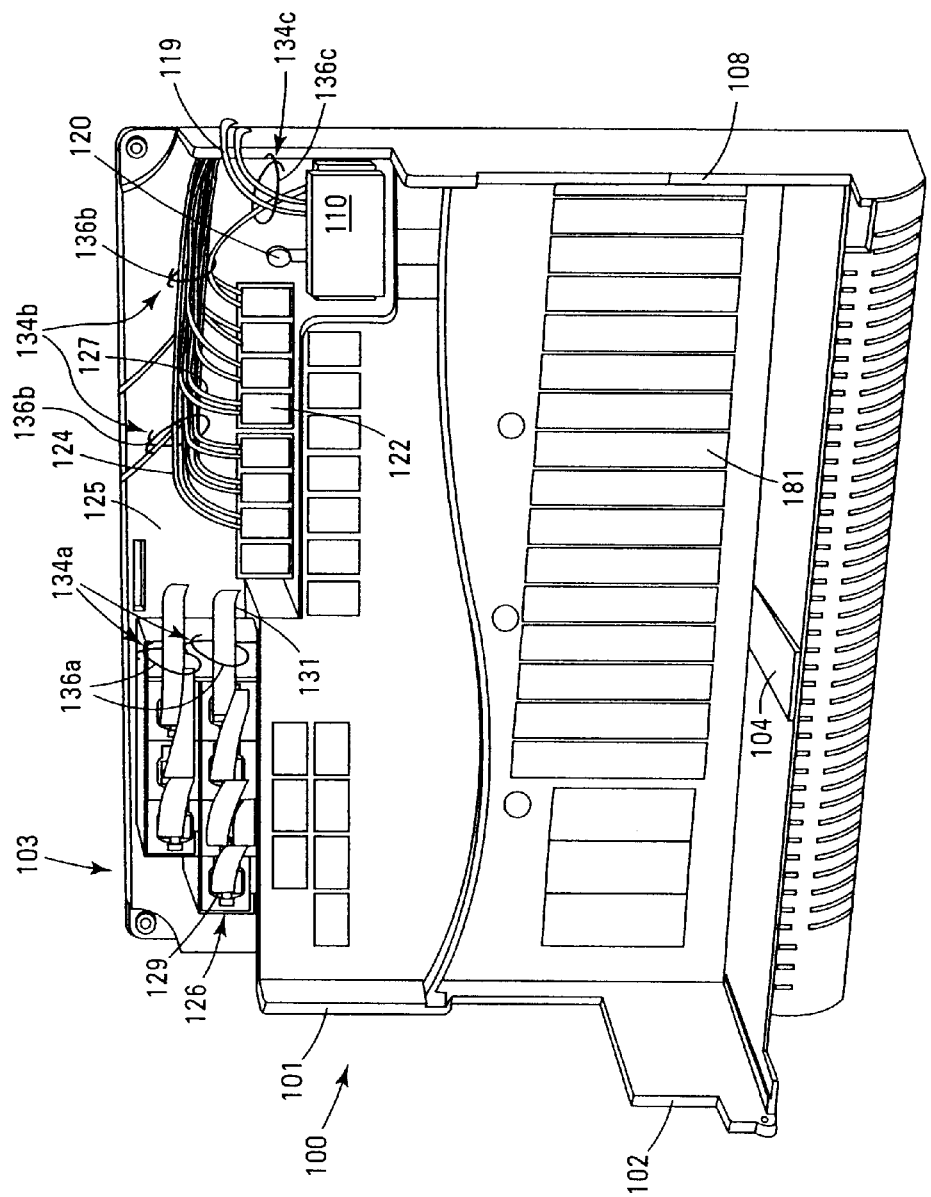
FIG. 2 is a front view of the housing of FIG. 1 with a cover open.
Figure 3:
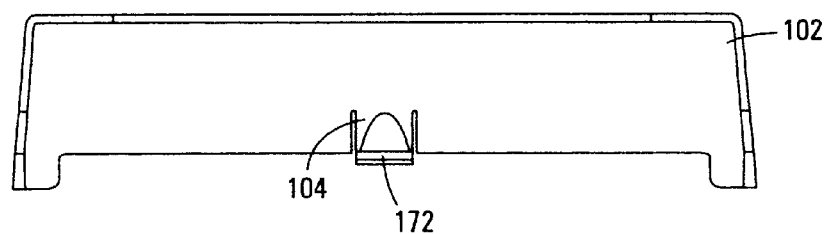
FIG. 3 is a top view of an embodiment of a cover for the housing of FIG. 1.

Cover 102 selectively opens compartment 103, as shown in FIG. 2, and closes compartment 103, as shown in FIG. 1. Cover 102 includes a resilient latch 104, as shown in FIG. 2 and FIG. 3 (a top view of cover 102) that enables cover 102 to be opened without a tool. When cover 102 closes housing 100, a slot 106 (shown in FIG. 5) in shell 101 receives latch 104. Resilient latch 104 is biased to grasp shell 101 when resilient latch 104 is received within slot 106. Cover 102 also includes a lead-out 108 for wires. In one embodiment, shell 101 and cover 102 are formed from plastic, for example, by molding. In another embodiment, shell 101 includes a number of vents 107, as shown in FIG. 1.

Figure 5:
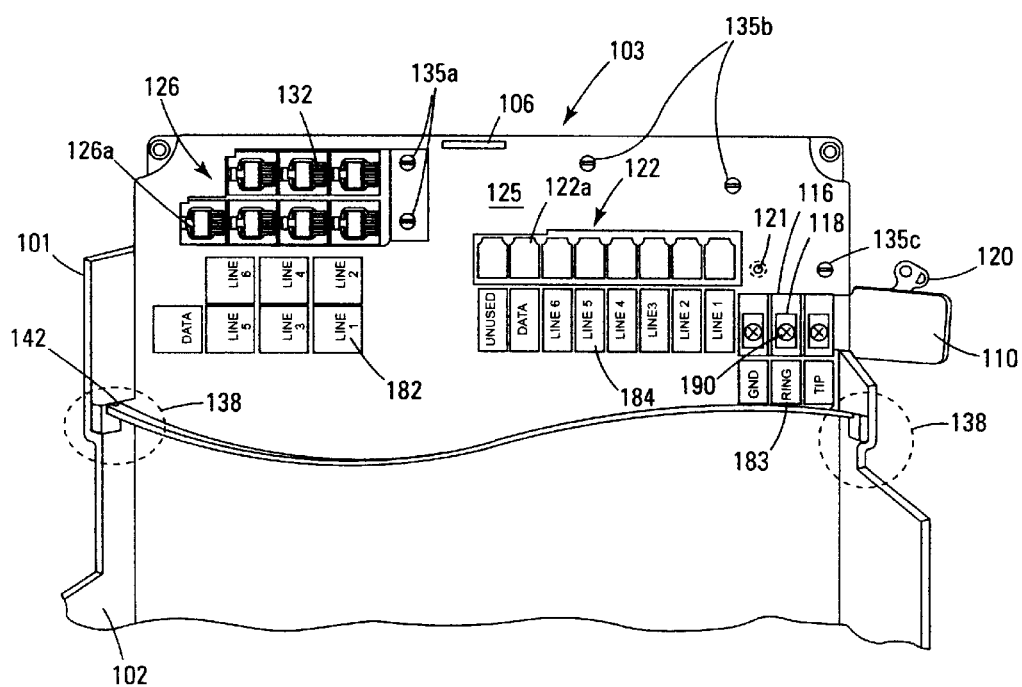
FIG. 5 is a front view of an embodiment of two compartments of the housing of FIG. 1.

A cover 110 (shown in FIGS. 2 and 5) is located within compartment 103. Cover 110 is pivotally attached to shell 101 for selectively opening a compartment 116 located in compartment 103, as shown in FIG. 5, and closing compartment 116, as shown in FIG. 2. Compartment 116 contains terminal strip 118, as shown in FIG. 5. Wires 119, shown as emanating from cover 110 in FIG. 2, terminate at terminal strip 118 within compartment 116. Wires 119 pass from compartment 116 through lead-out 108 and, in one embodiment, are connected to a service provider, such as a telephone company. Fastener 120 secures cover 110 to shell 101 when cover 110 closes compartment 116. In one embodiment, fastener 120 is a screw that is threaded into aperture 121 (shown in FIG. 5). In another embodiment, cover 110 is formed from plastic by molding.

A number of pivot connectors 122, e.g., as available from AMP, Inc., are located within compartment 103. As shown in FIG. 2, each of the pivot connectors 122 is oriented to receive a pair of wires 124 in a direction parallel to a plane of lead-out 108. Wires 124 pass through lead-out 108, as shown in FIG. 1, and are connected, in one embodiment, to subscriber equipment, e.g., telephones, facsimile machines, modems, etc. As described below, the orientation of pivot connectors 122 provides easier access for subscribers and helps to reduce the complexity of the paths of wires 122 and thus the size of housing 100.

Figure 6:
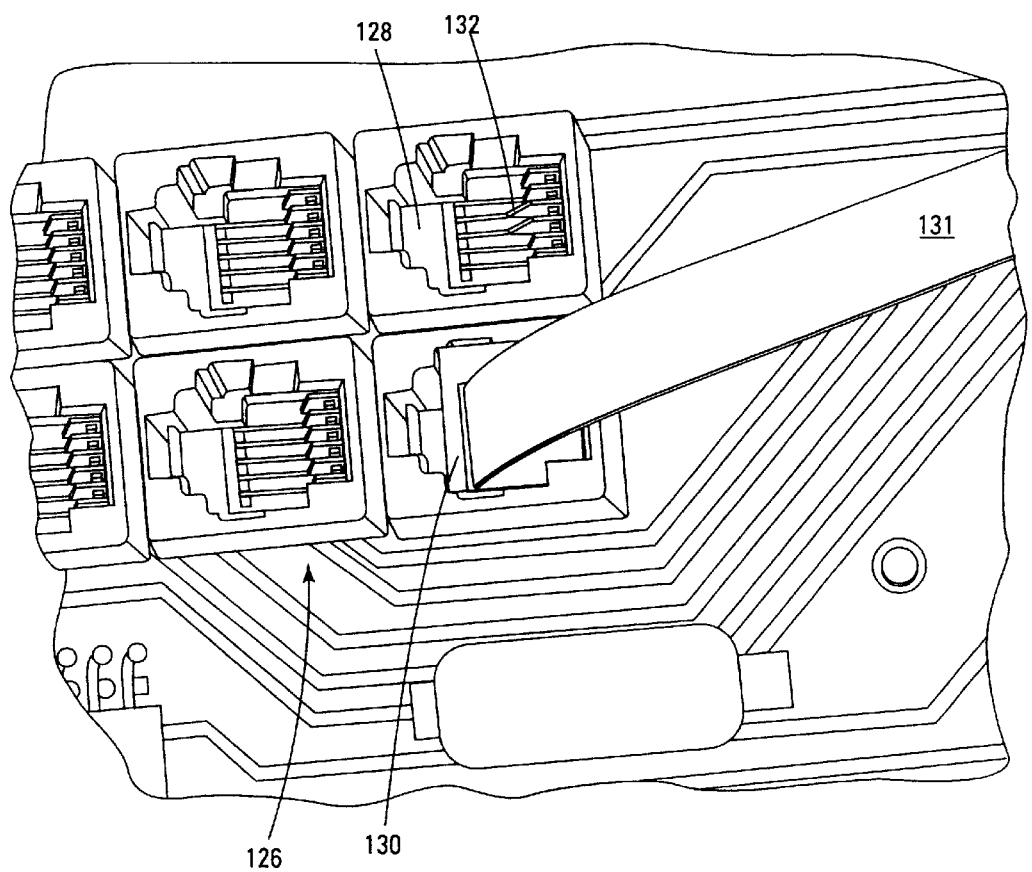
FIG. 6 is an enlarged view of several jacks located in one of the compartments of the housing of FIG. 5.

A number of jacks 126, such as RJ-11T jacks available from AMP, Inc., are also located within compartment 103. Each jack 126 has a cavity 128 for receiving a plug 130, such as an RJ-11T plug available from AMP, Inc., connected to a cable (or wire) 131, as shown in FIG. 6. FIG. 2 shows that cavity 128 is directly accessible upon opening cover 102 for easier access by subscribers and service providers. Cable 131 passes through lead-out 108, as shown in FIG. 1, and is connected, in one embodiment, to subscriber equipment, e.g., telephones, facsimile machines, modems, etc. Each cavity 128 contains resilient conductors 132 (shown in FIGS. 5 and 6). Each of jacks 126 is oriented so that resilient conductors 132 lie in a plane perpendicular to the plane of lead-out 108. As discussed below, this orientation helps to reduce the complexity of the paths of cables 131 and thus the size of housing 100. In another embodiment, plug 130 is connected to a tester.

Compartment 103, in one embodiment, includes a pathway 125 for wires, as shown in FIGS. 2 and 5. Pathway 125 extends longitudinally between jacks 126 and lead-out 108. Pivot connectors 122, in one embodiment, are located along a length of pathway 125 and are adjacent to pathway 125. The orientation of pivot connectors 122 is such that pivot connectors 122 are accessible from pathway 125, providing easier access for subscribers. Moreover, the orientation of pivot connectors 122 is such that wires 124 to flow from pivot connectors 122 and into pathway 125 after making a single bend, e.g., bend 127, as shown in FIG. 2, helping to reduce the complexity of the paths of wires 122 and thus the size of housing 100. The orientation of jacks 126 is such that cables 131 flow from jacks 126 and into pathway 125 after making a single bend, e.g., bend 129, as shown in FIG. 2, helping to reduce the complexity of the paths of cables 131 and thus the size of housing 100.

In one embodiment, compartment 116 is also located along a length of pathway 125 and is adjacent to pathway 125, as shown in FIG. 5. FIG. 2 shows that wires 119 also flow into pathway 125 after making a single bend, e.g., bend 133, helping to reduce the complexity of the paths of wires 119 and thus the size of housing 100.

Tie-downs 134a, 134b, and 134c, as shown in FIG. 2, are located in pathway 125. Tie-downs 134a, 134b, and 134c respectively secure wires 131, 124, and 119 to pathway 125 and are respectively located adjacent jacks 126, pivot connectors 122, and compartment 116, as shown in FIG. 2. In one embodiment, each of tie-downs 134a, 134b, and 134c respectively include eyelets 135a, 135b, and 135c that are integral with shell 101, as shown in FIG. 5, and ties 136a, 136b, and 136c, as shown in FIG. 2, that respectively pass through eyelets 135a, 135b, and 135c. Ties 136a, 136b, and 136c can be flexible plastic straps, wire, or the like.

Figure 4:
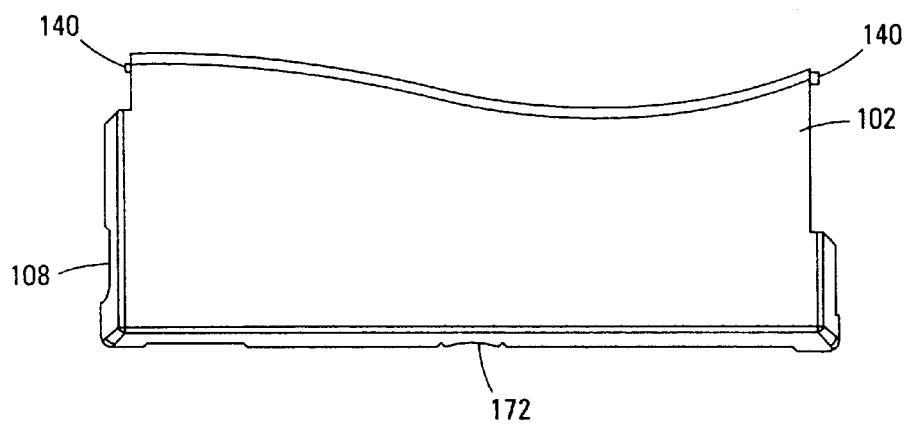
FIG. 4 is a front view of the cover of FIG. 3.
Figure 7:
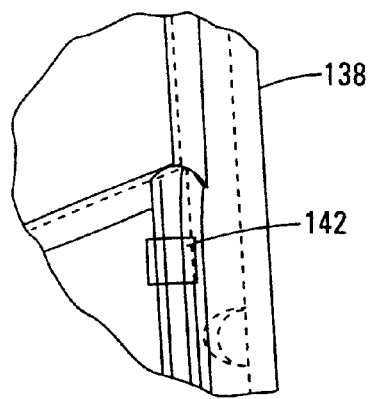
FIG. 7 is an enlarged view of region 138 in FIG. 5.

FIGS. 4 and 7 refer to the pivotal attachment of cover 102 to shell 101. FIG. 4 is a front view of cover 102, while FIG. 7 is an enlarged view of region 138 in FIG. 5. Cover 102 includes a pair of pins 140, as shown in FIG. 4. Each of pins 140 is received in a blind hole 142 (shown in FIGS. 5 and 7) in shell 101, such that the respective pin 140 rotates within the respective blind hole 142 as cover 102 pivots to open and close compartment 103.

Figure 8:
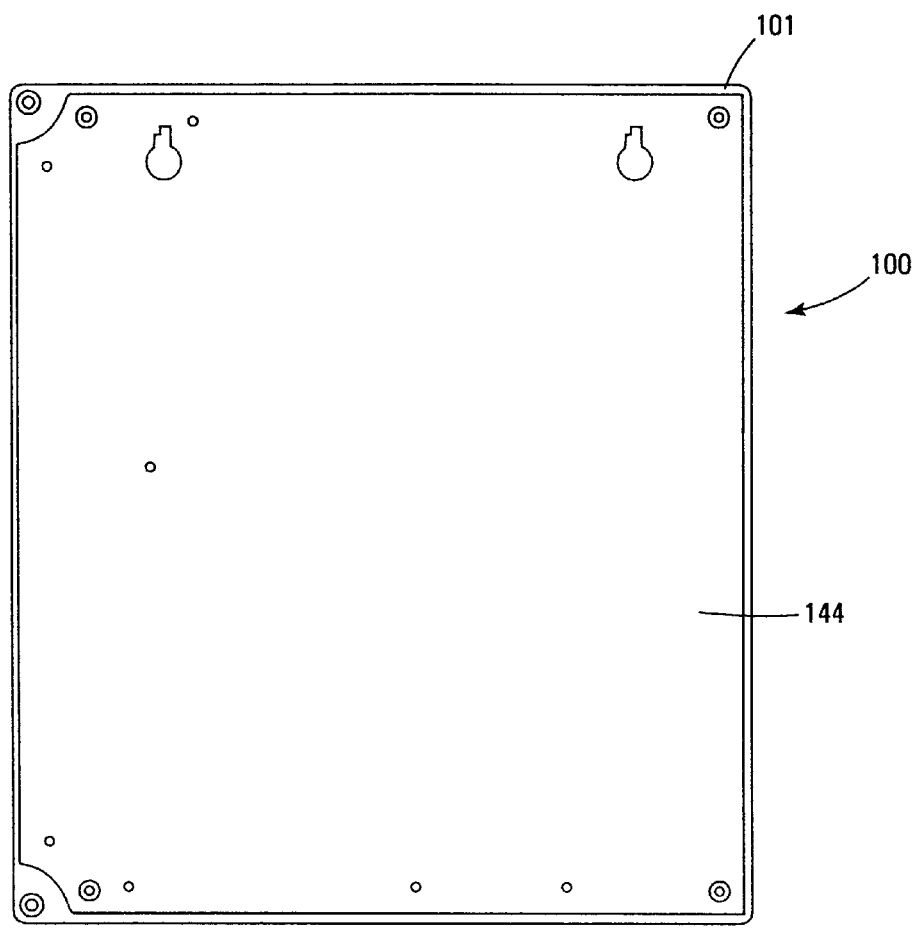
FIG. 8 is a back view of the housing of FIG. 1.

FIG. 8 is a back view of housing 100 showing that housing 100 includes a cover 144 that closes the back of shell 101. In one embodiment, cover 144 is formed from plastic by molding and is secured to the back of shell 101 using screws or the like.

Figure 9:
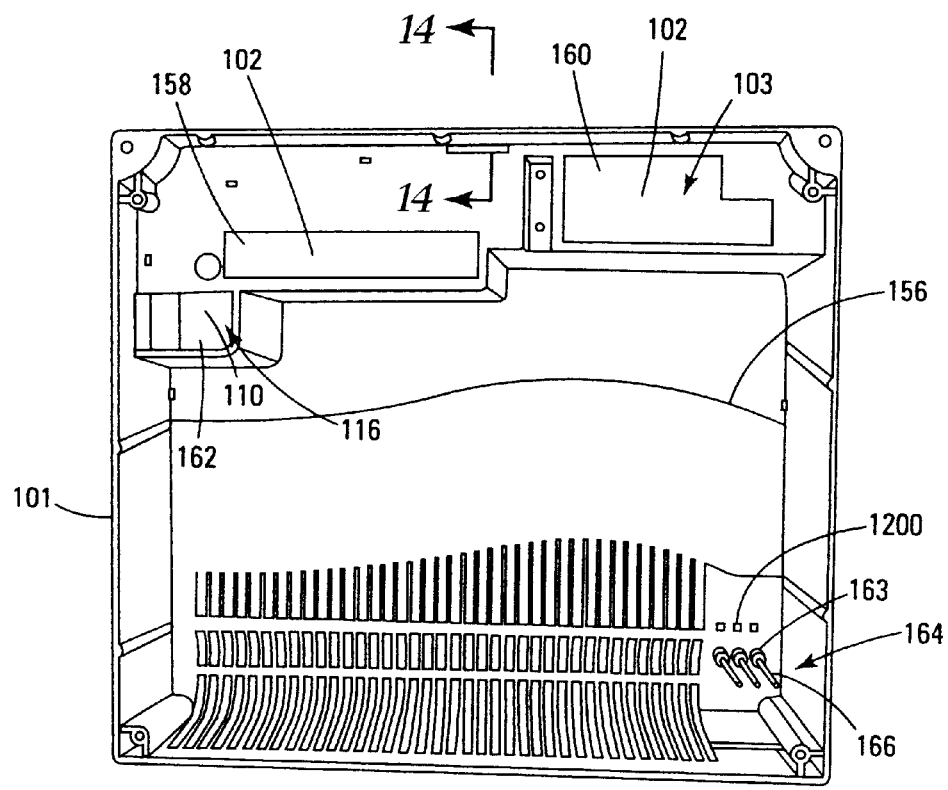
FIG. 9 is a back view showing an embodiment of another compartment of the housing of FIG. 1.
Figure 10:
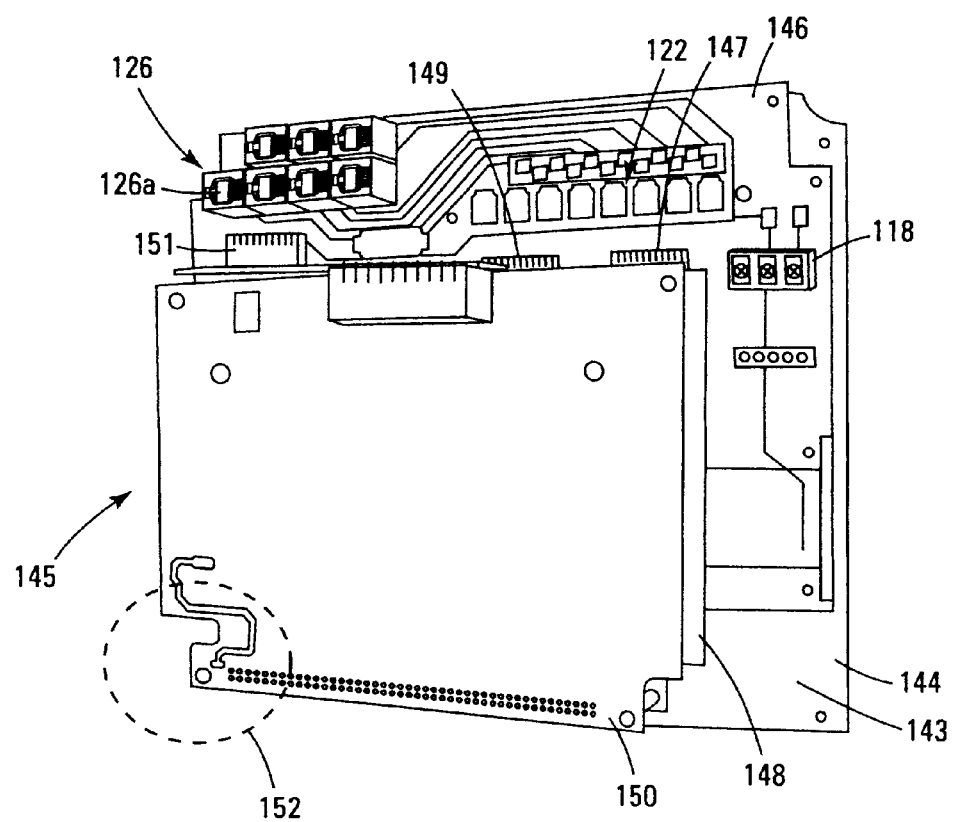
FIG. 10 is an interior view of an embodiment of a cover of the housing of FIG. 1 having circuit boards mounted thereon according to the teachings of the present invention.

FIG. 9 shows the back of shell 101 with cover 144 removed and FIG. 10 shows an interior surface 143 of cover 144. An integrated access device (IAD) 145, in one embodiment, is mounted on interior surface 143 using screws or the like. In one embodiment, IAD 145 includes circuit boards 146, 148 and 150. Each of pivot connectors 122, each of jacks 126, and terminal strip 118 are mounted on circuit board 146 by soldering, in one embodiment. Terminal strip 118 is connected to plug 151. Plug 147 is connected to circuit board 148, which in turn is connected to plug 149. Plug 149 is connected to jack 126a. Jacks 126 are connected to pivot connectors 122 on a one-to-one basis, as described below. Circuit board 146 serves as interface between subscriber equipment connected to pivot connectors 122 and jacks 126 and service provider equipment via circuit boards 148 and 150 and terminal strip 118.

Circuit boards 148 and 150 provide a communication link between terminal strip 118 and pivot connectors 122 and jacks 126. Circuit boards 148 and 150 multiplex a variety of subscriber equipment, e.g., telephones, facsimile machines, modems, etc., at the subscriber location onto a single pivot connector 122 or jack 126 for transmission to a network service provider. Circuit boards 148 and 150 also de-multiplex incoming streams, e.g., voice, data, etc., into their respective channels.

Figure 11:
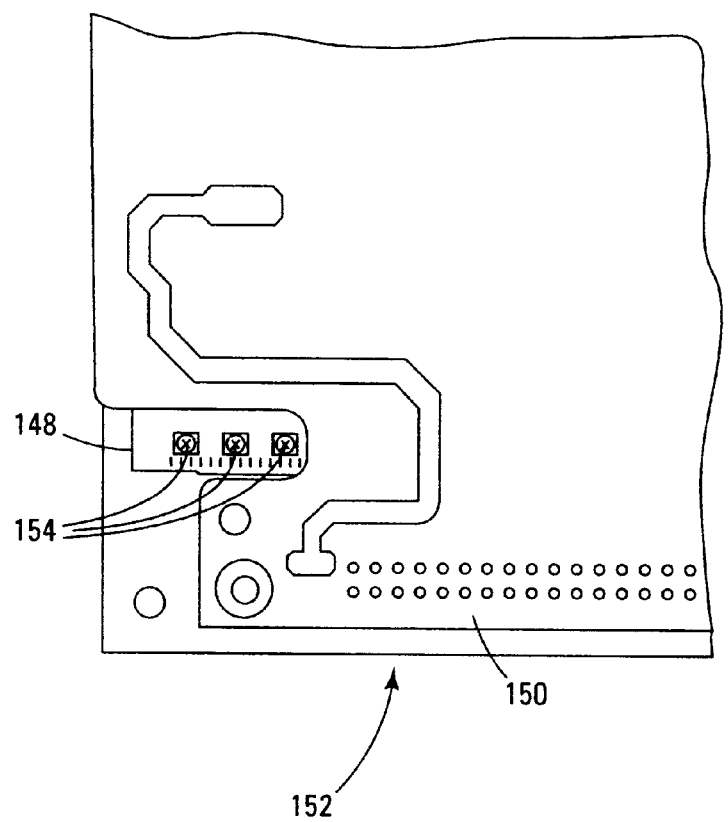
FIG. 11 is an enlarged view of region 152 of FIG. 10.

In one embodiment, circuit board 148 has a number of light emitting diodes (LEDs) 154, as shown in FIG. 11, an enlarged view of region 152 of FIG. 10. A corresponding one of LEDs 154 lights, for example, when circuit boards 146, 148, and 150 are powered up or transmit data signals or voice signals between subscriber and service provider equipment.

FIG. 9 shows that shell 101 has a compartment 156. Compartment 156 is closed by cover 144 and, in one embodiment, contains IAD 145. Compartment 156 communicates with compartment 103 via apertures 158 and 160. Apertures 158 and 160 respectively receive pivot connectors 122 and jacks 126 when cover 144 closes the back of shell 101. Compartment 156 also communicates with compartment 116 via an aperture 162. Aperture 162 receives terminal board 118 when cover 144 closes the back of shell 101.

Figure 12:
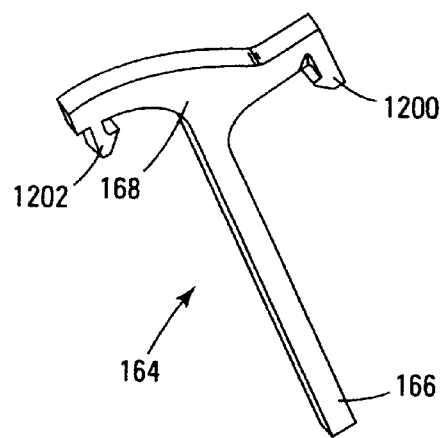
FIG. 12 is an isometric view of an embodiment of a light pipe.
Figure 13:
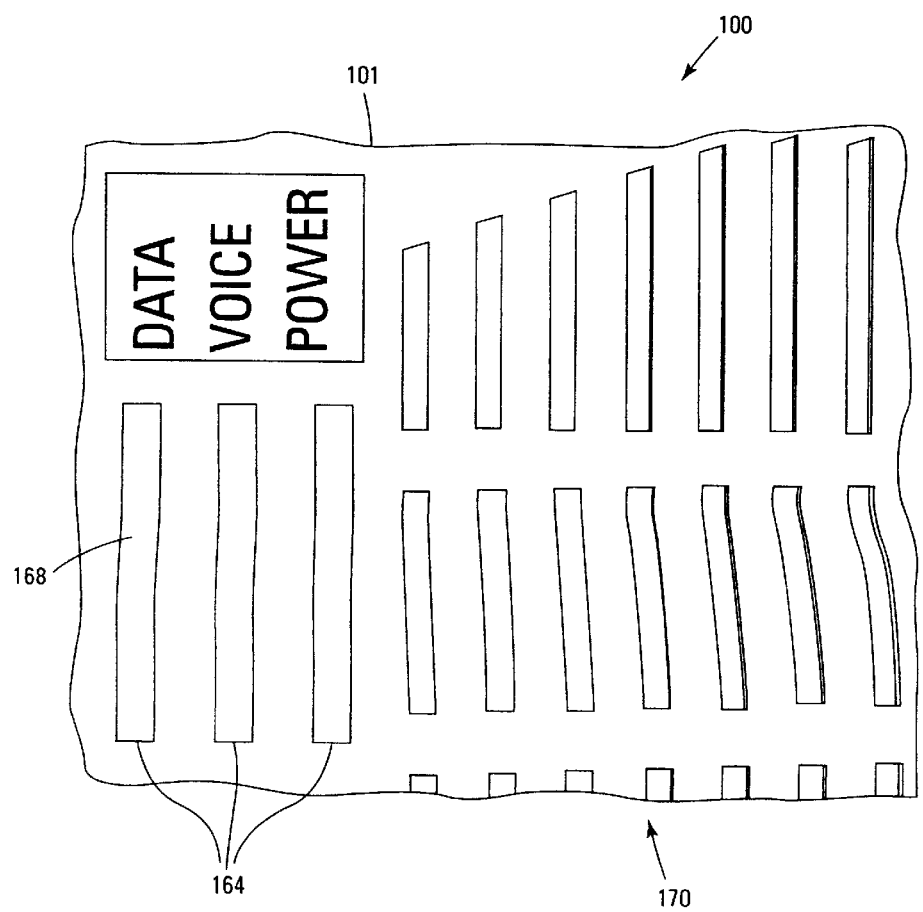
FIG. 13 is an enlarged view of region 170 in FIG. 1.

A number of light pipes 164 pass through shell 101 via apertures 163 and extend into compartment 156, as shown in FIG. 9. FIG. 12 shows an exemplary light pipe 164. Light pipe 164 includes integral portions 166 and 168. Portion 166 is located within compartment 156 adjacent one of LEDs 154 and passes through one of apertures 163. Portion 168 is disposed on the exterior of shell 101, as shown in FIG. 13, an enlarged view of region 170 in FIG. 1. Portion 168 of the light-pipe 164 is aligned with an indicator on the exterior of shell 101, for example, DATA, VOICE, or POWER, as shown in FIG. 13. In one embodiment, light-pipe 164 includes a clip 1200 that passes through shell 101, as shown in FIG. 9. Clip 1200 grasps shell 101 for securing light-pipe 164 to shell 101. In another embodiment, light-pipe 164 includes an additional clip 1202, as shown in FIG. 12, for passing through and grasping shell 101 to provide additional securement for light-pipe 164.

Light pipes 164 transmit light from LEDs 154 to the exterior of housing 100. For example, when circuit boards 146, 148, and 150 are powered up, one of light pipes 164 transmits the light from the corresponding one of LEDs 154 to the exterior of the housing so that the portion 168 aligned with POWER lights. Similarly, the portions 168 that are aligned with DATA and VOICE respectively light when circuit boards 146, 148, and 150 transmit data signals and voice signals between subscriber and service provider equipment. In one embodiment, light pipes 164 are formed from plastic, for example, by molding.

Figure 14:
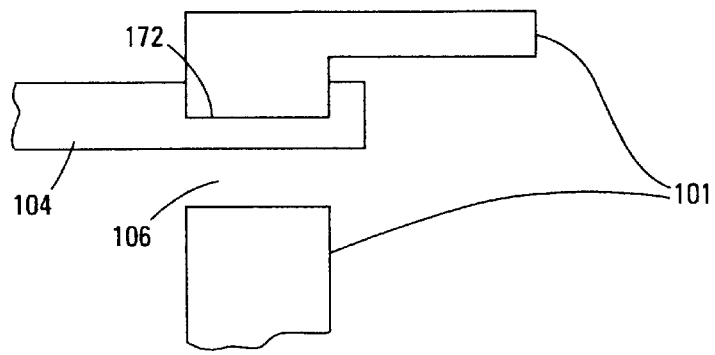
FIG. 14 is a cross-sectional view taken along line 14—14 of FIG. 9.
Figure 15:
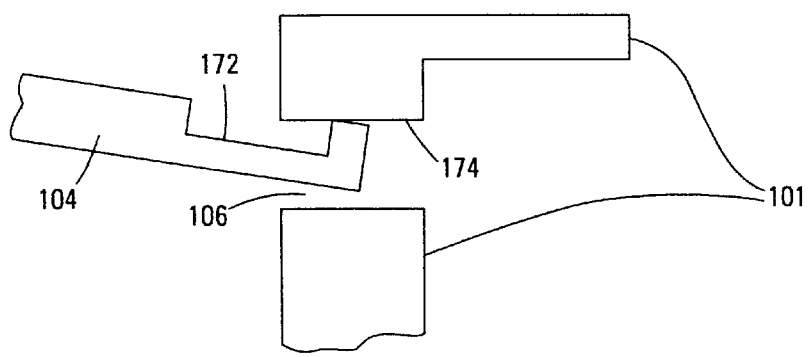
FIG. 15 demonstrates an embodiment of a slot in the housing of FIG. 1 receiving an embodiment of a latch of the cover of FIG. 3.
Figure 16:
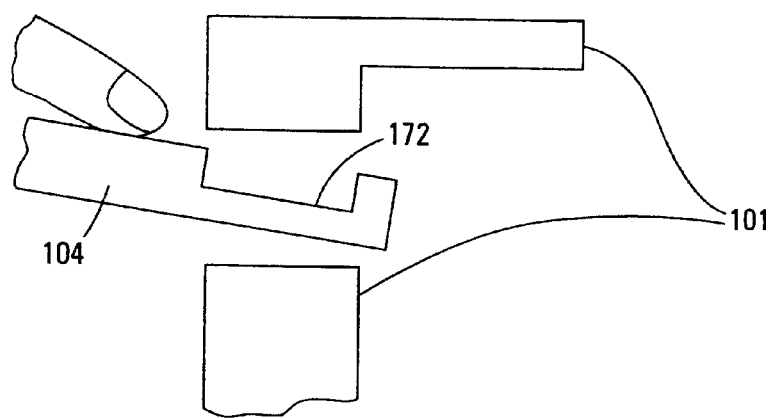
FIG. 16 demonstrates an embodiment of a method for disengaging the latch of FIG. 15 from the housing of FIG. 1.

Reference will now be made to FIGS. 3, 9, and 14–16 to describe resilient latch 104. FIG. 14 is a cross-sectional view taken along line 14—14 of FIG. 9. Resilient latch 104 includes a groove 172. When cover 102 is pivoted to close compartment 103, resilient latch 104 is deflected by boundary 174 of slot 106, as shown in FIG. 15. When cover 102 fully closes compartment 103, groove 172 grasps shell 101, as shown in FIG. 14. To open compartment 103, a user engages resilient latch 104 with a finger to deflect resilient latch 104 so that groove 172 no longer grasps shell 101, as shown in FIG. 16. The user then pivots cover 102 to open compartment 103.

Figure 17:
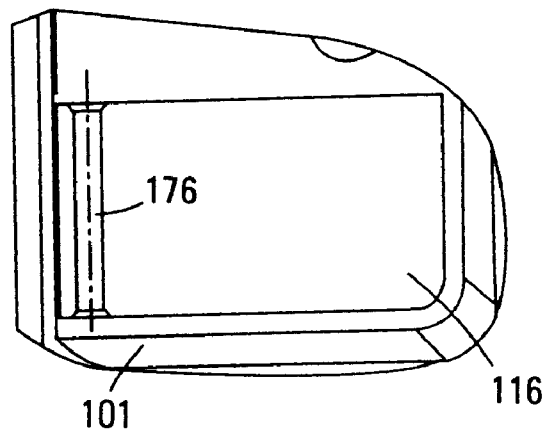
FIG. 17 illustrates an embodiment of a compartment of the housing of FIG. 1 without a cover.
Figure 18:
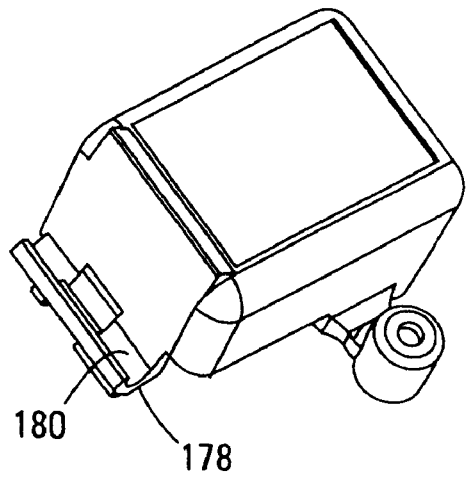
FIG. 18 is a top isometric view of an embodiment of a cover for the compartment of FIG. 17.

To explain the pivotal attachment of cover 110 to shell 101, reference is now made to FIGS. 17 and 18 that respectively illustrate compartment 116 without cover 110 and cover 110 detached from shell 101. A shaft 176 spans compartment 116 and is integral with shell 101. Cover 110 includes a hook-shaped portion 178 having a curved surface 180. Hook-shaped portion 178 receives shaft 176 so that surface 180 is movable relative shaft 176. This pivotally attaches cover 110 to shell 101.

In one embodiment, an interior surface of cover 102 has several recesses 181 that are respectively aligned with each of the pivot connectors 122, as shown in FIG. 2. Each recess 181 is adapted to display an identifier, such as a telephone number, for the pivot connector aligned therewith.

Several recesses 182 are located adjacent jacks 126, as illustrated in FIG. 5. Recesses 182 are arranged in a pattern that mimics the pattern of jacks 126 so that recesses 182 correspond with jacks 126 on a one-to-one basis. Each of recesses 182 bears an indicator for identifying the corresponding jack 126. For example, the recess 182 having the indicator DATA corresponds to the jack 126 (e.g., jack 126a) for receiving and transmitting data; the recess 182 having the indicator LINE 1 corresponds to the jack 126 for line 1; etc.

Each of recesses 183 is respectively aligned with terminals 190 of terminal strip 118. Each of recesses 183 displays an indicator, e.g., RING, TIP, and GND, for identifying the terminal 190 aligned therewith.

FIG. 5 also shows several recesses 184 adjacent pivot connectors 122. Each of recesses 184 is respectively aligned with each of the plurality pivot connectors 122. Each of recesses 184 displays an indicator for identifying the pivot connector 122 aligned therewith. For example, the recess 184 having the indicator UNUSED corresponds to the pivot connector 122 that is not being used; the recess 184 having the indicator LINE 1 corresponds to the pivot connector 122 for line 1; etc.

Figure 19:
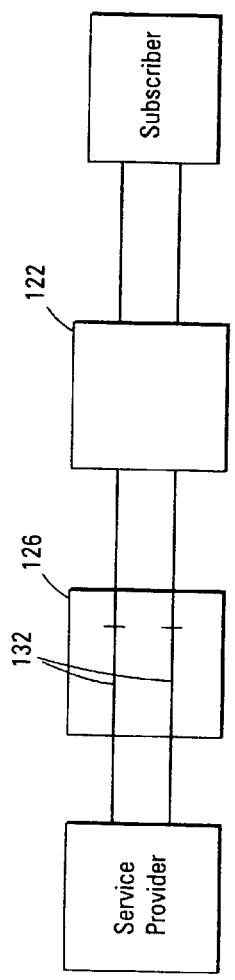
FIG. 19 is a top view illustrating an embodiment of a jack connected to an embodiment of a pivot connector in series.
Figure 20:
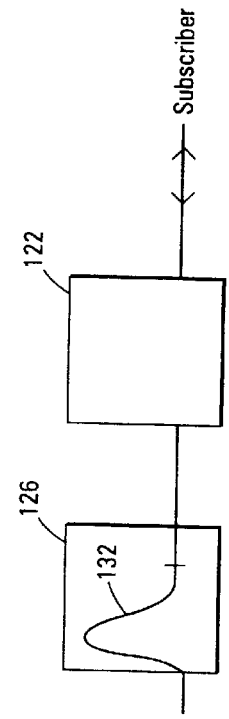
FIG. 20 is a side view illustrating the jack of FIG. 19 connected to the pivot connector of FIG. 19 in series.
Figure 21:
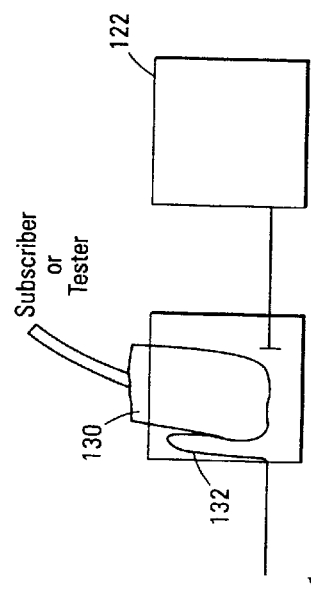
FIG. 21 is a side view illustrating an embodiment of how the insertion of the plug of FIG. 19 into the jack of FIG. 19 disconnects the jack from the pivot connector.

The jacks 126 and the pivot connectors 122 having common indicators, e.g., DATA, LINE 1, etc., are connected electrically in series when plugs 130 are not inserted in the respective jacks 126. This is illustrated in FIGS. 19 and 20, which respectively show top and side views of a jack 126 without plug 130. When a plug 130 is not inserted in jack 126 resilient conductors 132 connect the service provider via terminal strip 118 and circuit boards 148 and 150 to a pivot connector 122. When plug 130 is inserted into jack 126, plug 130 displaces resilient conductors 132, disconnecting resilient conductors 132 from pivot connector 122, as shown in FIG. 21. Moreover, the resiliency of resilient conductors 132 causes resilient conductors 132 to bear against conductors on plug 130 to electrically connect plug 130 to resilient conductors 132 and thus to the service provider.

In one embodiment, pivot connectors 122 are connected to subscriber equipment and jacks 126 are used for testing.

In this embodiment, jacks 126 do not contain plugs 130 during normal operation, as depicted in FIGS. 19 and 20. For testing, a plug 130 connected to a tester is inserted in one of jacks 126, disconnecting the corresponding pivot connector 122 and connecting the tester to the service provider to isolate failures to either the subscriber or the service-provider.

In another embodiment, jacks 126 receive plugs 130 that are connected to subscriber equipment by cables 131. In this embodiment, testing is accomplished by removing the plugs 130 attached to cables 131 from jacks 126 and inserting a plug 130 attached to a tester into jacks 126 one at a time. In other embodiments, some of jacks 126 receive plugs 130 that are connected to subscriber equipment by cables 131, and some of the pivot connectors 122 that do not correspond to the jacks 126 with plugs 130 are connected to subscriber equipment.

Figure 22:
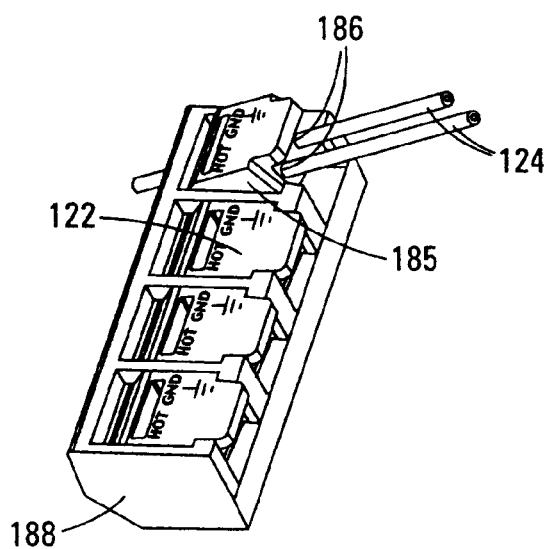
FIG. 22 is an enlarged view of an embodiment of a set of pivot connectors.

FIG. 22 is an enlarged view of an exemplary set of pivot connectors 122. Each pivot connector 122 has a wire stuffer 185 having pair of wire entry holes 186 for receiving the respective insulated ends of wires 124. Wire stuffer 185 is pivoted flush with a base 188 to secure and electrically couple wires 124 to pivot connector 122.

Conclusion

Embodiments of the present invention have been described. The embodiments provide a housing having subscriber compartments that are accessible without tools and in which the connectors are laid out for easier access by subscribers and for reducing the complexity of the wiring paths and thus the size of the housing.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, although seven jacks 126 and eight pivot connectors 122 are shown in the embodiments described above, more or fewer of jacks 126 and pivot connectors 122 can be located in compartment 103. Moreover, embodiments of the present invention can be used for housings for other types of telecommunications equipment that provide connections between subscribers and networks.

What is claimed is:

1. A housing comprising:
   a cover
   a shell removably coupled to the cover;
   a first compartment;
   a first cover pivotally attached to the shell for selectively opening and closing the first compartment, the first cover comprising a resilient latch biased for grasping the shell and a lead-out for wires;
   a second compartment located in the first compartment;
   a second cover pivotally attached to the shell for selectively opening and closing the second compartment;
   a plurality of pivot connectors located in the first compartment, each of the plurality of pivot connectors oriented to receive a wire in a direction parallel to a plane of the lead-out for wires; and
   a plurality of jacks located in the first compartment, each of the plurality of jacks having at least one resilient conductor, each of the plurality of jacks oriented so that the at least one resilient conductor lies in a plane perpendicular to the plane of the lead-out for wires.

2. The housing of claim 1, wherein an interior surface of the first cover is adapted to display an identifier for each of the pivot connectors.

3. The housing of claim 2, wherein the identifier is a telephone number.

4. The housing of claim 1, and further comprising a plurality of tie-downs located in the first compartment and adapted to secure wires to the shell.

5. The housing of claim 4, wherein each of the plurality of tie-downs comprises an eyelet.

6. The housing of claim 5, wherein a tie passes through the eyelet.

7. The housing of claim 1, and further comprising a pathway for wires.

8. The housing of claim 7, and further comprising a plurality of tie-downs in the pathway for securing the wires to the pathway.

9. The housing of claim 1, wherein the wire received by each of the pivot connectors passes through the lead-out for wires, wherein plurality of jacks receives a plug connected to a cable that passes through the lead-out for wires, and wherein wires pass from the second compartment through the lead-out for wires.

10. The housing of claim 4, wherein a first portion of the plurality of tie-downs secures wires received by the pivot connectors to the shell, a second portion of the plurality of tie-downs secures cables that are attached to plugs received by the plurality of jacks to the shell, and a third portion of the plurality of tie-downs secures wires connected within the second compartment to the shell.

11. The housing of claim 1, and further comprising at least one light-pipe for transmitting light from the interior to the exterior of the housing.

12. The housing of claim 11, wherein the at least one light-pipe comprises first and second portions, the first portion located within the housing adjacent a light source and the second portion disposed on the exterior of the shell.

13. The housing of claim 12, wherein the light source is a light emitting diode.

14. The housing of claim 12, wherein the second portion of the light-pipe is aligned with an indicator on the exterior of the shell.

15. The housing of claim 1, wherein the plurality of pivot connectors and the plurality of jacks are mounted on a circuit board.

16. The housing of claim 1, wherein each of the plurality of jacks is respectively connected in series to each of the plurality of pivot connectors.

17. The housing of claim 16, wherein receiving a plug in the jack disconnects the jack from the respective pivot connector.

18. The housing of claim 1, wherein the shell comprises a plurality of vents.

19. The housing of claim 1, wherein the second compartment contains a terminal strip.

20. The housing of claim 1, wherein the shell is adapted to display indicators for identifying each of the plurality of pivot connectors.

21. The housing of claim 1, wherein the shell is adapted to display indicators for identifying each of the plurality of jacks.

22. The housing of claim 19, wherein the shell is adapted to display indicators for identifying each of a plurality of terminals on the terminal strip.

23. The housing of claim 1, wherein the second cover is securable to the shell when the second cover closes the second compartment.

24. A housing comprising:

a shell;

a first compartment;

a first cover pivotally attached to the shell for selectively opening and closing the first compartment, the first cover comprising a resilient latch biased for grasping the shell and a lead-out for wires;

a second compartment located in the first compartment;

a second cover pivotally attached to the shell for selectively opening and closing the second compartment;

a plurality of pivot connectors located in the first compartment, each of the plurality of pivot connectors oriented to receive a wire in a direction parallel to a plane of the lead-out for wires;

a plurality of jacks located in the first compartment, each of the plurality of jacks having at least one resilient conductor, each of the plurality of jacks oriented so that the at least one resilient conductor lies in a plane perpendicular to the plane of the lead-out for wires; and a third compartment that communicates with the first and second compartments, the third compartment containing a plurality of circuit boards.

25. The housing of claim 24, and further comprising a plurality of tie-downs located in the first compartment and adapted to securing wires to a pathway for wires within the first compartment.

26. The housing of claim 24, and further comprising a third cover for closing the third compartment.

27. The housing of claim 24, wherein an interior surface of the first cover comprises a plurality of recesses, each of the plurality of recesses respectively aligned with each of the plurality pivot connectors, wherein each recess is adapted to display an identifier for the pivot connector aligned therewith.

28. The housing of claim 24, wherein the wire received by each of the pivot connectors passes through the lead-out for wires, wherein plurality of jacks receives a plug connected to a cable that passes through the lead-out for wires, and wherein wires pass from the second compartment through the lead-out for wires.

29. The housing of claim 24, and further comprising at least one light-pipe for transmitting light from the interior to the exterior of the housing.

30. The housing of claim 24, wherein the plurality of pivot connectors and the plurality of jacks are mounted on one of the plurality of circuit boards.

31. The housing of claim 26, wherein the plurality of circuit boards are mounted on the third cover.

32. The housing of claim 24, wherein the second compartment contains a terminal strip that is mounted on one of the plurality of circuit boards.

33. A housing comprising:

a shell;

a first compartment;

a first cover pivotally attached to the shell for selectively opening and closing the first compartment, the first cover comprising a resilient latch biased for grasping the shell and a lead-out for wires;

a second compartment located in the first compartment;

a second cover pivotally attached to the shell for selectively opening and closing the second compartment;

a third compartment closed by a third cover, the third compartment containing a plurality of circuit boards;

a plurality of pivot connectors mounted on one of the plurality of circuit boards, the plurality of pivot connectors protruding through a first aperture in the shell and into the first compartment;

a plurality of jacks mounted on one of the plurality of circuit boards, the plurality of jacks protruding through a second aperture in the shell and into the first compartment;

a terminal strip mounted on one of the plurality of circuit boards, the terminal strip protruding through a third aperture in the shell and into the second compartment; and a plurality of tie-downs located in the first compartment and adapted to securing wires to the housing.

34. The housing of claim 33, wherein each of the plurality of jacks has at least one resilient conductor oriented so that the at least one resilient conductor lies in a plane perpendicular to a plane of the lead-out for wires.

35. The housing of claim 33, wherein each of the plurality of pivot connectors is oriented to receive a wire in a direction parallel to a plane of the lead-out for wires.

36. The housing of claim 33, wherein an interior surface of the first cover is adapted to display an identifier for each of the pivot connectors.

37. The housing of claim 33, and further comprising at least one light-pipe for transmitting light from the interior to the exterior of the housing.

38. The housing of claim 33, wherein the shell comprises a plurality of vents.

39. The housing of claim 33, wherein the shell is adapted to display indicators for identifying at least one of each of the plurality of pivot connectors, each of the plurality of jacks, and each of a plurality of terminals on the terminal strip.

40. A method for manufacturing a housing, the method comprising:

forming a shell for defining first and second compartments within the housing, the second compartment located within the first compartment;

forming a cover that closes the back of the shell;

forming a first cover comprising a lead-out for wires and a resilient latch;

pivotally attaching the first cover to the shell for selectively opening and closing the first compartment, wherein the latch grasps the shell when the cover closes the shell;

forming a second cover;

pivotally attaching the second cover to the shell for selectively opening and closing the second compartment;

orienting each of a plurality of pivot connectors within the first compartment for receiving a wire in a direction parallel to a plane of the lead-out for wires; and orienting each of a plurality of jacks within the first compartment so that at least one resilient conductor within each of the plurality of jacks lies in a plane perpendicular to the plane of the lead-out for wires.

41. The method of claim 40, wherein forming the first cover comprises forming a plurality of recesses on an inside surface of the first cover.

42. The method of claim 40, and further comprising forming a plurality of tie-downs within the first compartment for securing wires to the shell.

43. The method of claim 40, wherein forming the shell comprises forming a plurality of eyelets on the shell within the first compartment.

44. The method of claim 43, and further comprising passing a tie for securing wires to the shell through each of the eyelets.

45. The method of claim 40, wherein forming the shell comprises forming a plurality of vents in the shell.

46. The method of claim 40, and further comprising connecting the jacks and pivot connectors in series on a one-to one basis.

47. The method of claim 40, and further comprising locating a terminal strip within the second compartment.

48. The method of claim 40, wherein forming the shell comprises forming indicators on a surface of the shell within the first compartment for identifying at least one of each of the plurality of pivot connectors and each of the plurality of jacks.

49. The method of claim 40, wherein forming the shell comprises forming at least one aperture in the shell for receiving a light-pipe.

50. The method of claim 40, and further comprising forming at least one light-pipe for transmitting light from the interior to the exterior of the housing and passing the at least one light-pipe through an aperture in the shell.

51. The method of claim 40, wherein forming the shell comprises forming at least one indicator on an external surface of the shell that is aligned with a light-pipe for transmitting light from the interior to the exterior of the housing.

52. The method of claim 40, wherein orienting each of the plurality of pivot connectors comprises mounting each of the plurality pivot connectors on a circuit board.

53. The method of claim 40, wherein orienting each of the plurality of jacks comprises mounting each of the plurality of jacks on a circuit board.

54. The method of claim 47, wherein locating the terminal strip within the second compartment comprises mounting the terminal strip on a circuit board.

55. The method of claim 47, wherein forming the shell comprises forming indicators on a surface of the shell within the first compartment for identifying each of a plurality of terminals on the terminal strip.

56. The method of claim 40, wherein forming the shell comprises forming a pathway for wires within the first compartment.

57. The method of claim 56, and further comprising forming a plurality of tie-downs in the pathway.

58. A method for manufacturing a housing, comprising:

forming a shell for defining first, second, and third compartments within the housing, the second compartment located within the first compartment, the first and third compartments communicating through first and second apertures in the shell, the second and third compartments communicating through a third aperture in the shell;

forming a plurality of tie-downs within the first compartment for securing wires to the shell;

forming a first cover comprising a lead-out for wires and a resilient latch;

pivotally attaching the first cover to the shell for selectively opening and closing the first compartment, wherein the latch grasps the shell when the cover closes the shell;

forming a second cover;

pivotally attaching the second cover to the shell for selectively opening and closing the second compartment;

providing a plurality of circuit boards;

mounting a plurality of pivot connectors on one of the plurality of circuit boards;

mounting a plurality of jacks on one of the plurality of circuit boards;

mounting a terminal strip on one of the plurality of circuit boards;

forming a third cover;

mounting the plurality of circuit boards on the third cover; and closing the third compartment using the third cover so that the plurality of circuit boards are contained within the third compartment and so that the plurality of jacks protrudes through the first aperture into the first compartment, the plurality of pivot connectors protrudes through the second aperture into the first compartment, and the terminal strip protrudes through the third aperture into the second compartment.

59. The method of claim 58, wherein mounting the plurality of circuit boards to the third cover comprises interconnecting each of the plurality of circuit boards.

60. The method of claim 58, wherein mounting the plurality of pivot connectors comprises orienting each of the plurality of pivot connectors for receiving a wire in a direction parallel to a plane of the lead-out for wires.

61. The method of claim 58, wherein mounting the plurality of jacks comprises orienting each of the plurality of jacks so that at least one resilient conductor within each of the plurality of jacks lies in a plane perpendicular to a plane of the lead-out for wires.

62. The method of claim 58, wherein forming the shell comprises forming a fourth aperture in the shell for receiving a light-pipe.

63. The method of claim 58, and further comprising forming at least one light-pipe for transmitting light from the interior to the exterior of the housing and passing the at least one light-pipe through a fourth aperture in the shell.

* * * * *